United States Patent
Carter et al.

(10) Patent No.: US 12,479,874 B2
(45) Date of Patent: Nov. 25, 2025

(54) SYNTHESIS OF METALLOCENE POLYMERIZATION CATALYST

(71) Applicant: NOVA CHEMICALS (INTERNATIONAL) S.A., Fribourg (CH)

(72) Inventors: Charles Carter, Calgary (CA); Janelle Smiley-Wiens, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 595 days.

(21) Appl. No.: 17/440,424

(22) PCT Filed: Mar. 16, 2020

(86) PCT No.: PCT/IB2020/052396
§ 371 (c)(1),
(2) Date: Sep. 17, 2021

(87) PCT Pub. No.: WO2020/188473
PCT Pub. Date: Sep. 24, 2020

(65) Prior Publication Data
US 2022/0153771 A1    May 19, 2022

(30) Foreign Application Priority Data
Mar. 20, 2019 (CA) .................... 3037415

(51) Int. Cl.
*C07F 17/00* (2006.01)
(52) U.S. Cl.
CPC .................... *C07F 17/00* (2013.01)
(58) Field of Classification Search
CPC ..... C07F 17/00; C01G 27/003; C01G 25/003; C01G 23/00
See application file for complete search history.

(56) References Cited

U.S. PATENT DOCUMENTS

| | | | |
|---|---|---|---|
| 7,468,452 B1 | 12/2008 | Martin et al. | |
| 2001/0025115 A1* | 9/2001 | Campbell, Jr. | C08F 210/16 556/7 |
| 2018/0305531 A1* | 10/2018 | Zhang | C08L 23/0815 |

FOREIGN PATENT DOCUMENTS

| | | | |
|---|---|---|---|
| CN | 105646741 A | 6/2016 | |
| WO | WO-0024792 A1 * | 5/2000 | ............. C07F 17/00 |

OTHER PUBLICATIONS

S. Miller, et al., 23, Organometallics, 1777-1789 (2004) (Year: 2004).*
N.G. Anderson, Practical Process & Research Development 81-111 (2000) (Year: 2000).*
STN/CAPLUS Abstract and Indexed Compounds Z. Zhang, et al., US 2018/0305531 A1 (2018) (Year: 2018).*
Y. Hayashi, 7 Chemical Science, 866-880 (2016) ("Hayashi") (Year: 2016).*
N.G. Anderson, Practical Process & Research Development (2000) (Year: 2000).*
Alt, Helmut G. and ZENCK, Roland, "Syndiospezifische Polymerisation von Propylen: 2- und 2,7-substituierte Metallocenkomplex des Types . . . ", Journal of Organometallic Chemistry 522 (1996) 39-54, Sep. 26, 1995, 16 pages.
Kaminsky, Walter; Hopf, Andreas; Peil, Christian; "Cs-symmetric hafnocene complexes for synthesis of syndiotactic polypropene", Journal of Organometallic Chemistry 684 (2003) 200-205, 6 pages.
Pangborn, Amy B.; Giardello, Michael A.; Grubbs, Robert H.; Rosen, Robert K.; Timmers, Francis J.; "Safe and Convenient Procedure for Solvent Purification", Organometallics 1996, 15, 1518-1520, May 22, 1995, 3 pages.

* cited by examiner

*Primary Examiner* — Adam C Milligan
*Assistant Examiner* — Frank S. Hou
(74) *Attorney, Agent, or Firm* — Thomas J. Styslinger, Reg. No. 75185

(57) ABSTRACT

A one pot synthetic method for making a bridged cyclopentadienyl/fluorenyl type ligand and the corresponding ansa metallocene polymerization catalyst. In a key step, a cyclopentadienide/fluorenide dianion is prepared by combining a fluorene compound, a fulvene compound, and at least 2 molar equivalents of $KN(SiMe_3)_2$ in any order in the presence of an ether solvent under ambient conditions. Reaction of the cyclopentadienide/fluorenide dianion with a Group IV transition metal chloride, followed by alkylation gives a metallocene polymerization catalyst in good yields.

13 Claims, No Drawings

SYNTHESIS OF METALLOCENE POLYMERIZATION CATALYST

CROSS-REFERENCE TO RELATED PATENT APPLICATIONS

This application is a U.S. National Phase Application under 35 U.S.C. § 371 of PCT/IB2020/052396, filed on Mar. 16, 2020, which claims the benefit of priority to Canadian Patent Application No. 3037415, filed on Mar. 20, 2019, both of which are incorporated herein by reference in their entirety.

TECHNICAL FIELD

The present disclosure is aimed at providing an improved synthetic method for making a bridged cyclopentadienyl/fluorenyl type ligand and the corresponding ansa metallocene pre-polymerization catalyst. The improved synthetic method selects and utilizes a specific base, which has advantages over other bases known in the art, with respect to facilitating the formation of a key cyclopentadienyl/fluorenyl type ligand precursor.

BACKGROUND ART

The use of metallocene compounds having a bridged cyclopentadienyl/fluorenyl type ligand set for the polymerization of olefins is well known to persons skilled in the art. The known method for making such ansa-metallocene compounds generally involves as a key step, the reaction of an anionic fluorenide compound with a fulvene compound to generate a bridged cyclopentadienide-fluorene type ligand precursor. It would be advantageous if the synthesis of these ansa metallocene compounds could be further simplified over the reported literature methods. Especially desirable would be a synthetic procedure which could afford the final ligand or even the ansa metallocene compound itself in higher yields, preferably at ambient conditions, and which could be carried out in fewer steps and/or in a single reaction vessel.

SUMMARY OF INVENTION

The present disclosure provides a simple, one pot method for making a metallocene (II-Cl$_2$) having the following structure:

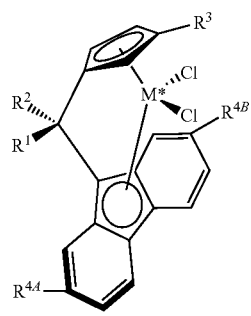

wherein $R^1$ and $R^2$ are independently an unsubstituted or substituted alkyl, aryl, or alkenyl group; $R^3$ is hydrogen, or an unsubstituted or substituted alkyl, aryl, or alkenyl group, or a substituted silyl group; $R^{4A}$ and $R^{4B}$ are independently a hydrocarbyl group, or hydrogen; and M* is Ti, Zr, or Hf.

The present disclosure provides a simple, one pot method for making a metallocene (II-R$^5$$_2$) having the following structure:

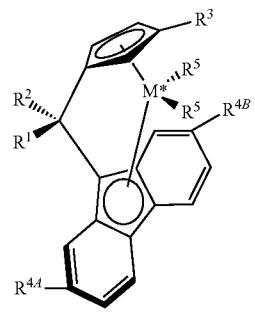

wherein $R^1$ and $R^2$ are independently an unsubstituted or substituted alkyl, aryl, or alkenyl group; $R^3$ is hydrogen, or an unsubstituted or substituted alkyl, aryl, or alkenyl group, or a substituted silyl group; $R^{4A}$ and $R^{4B}$ are independently a hydrocarbyl group, or hydrogen; $R^5$ is a methyl, or a benzyl group; and M* is Ti, Zr, or Hf.

The present disclosure provides a simple, one pot method for making the compound (I) having the structure:

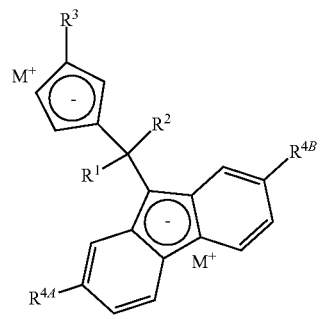

wherein $R^1$ and $R^2$ are independently an unsubstituted or substituted alkyl, aryl, or alkenyl group; $R^3$ is hydrogen, or an unsubstituted or substituted alkyl, aryl, or alkenyl group, or a substituted silyl group; $R^{4A}$ and $R^{4B}$ are independently a hydrocarbyl group, or hydrogen; and M$^+$ is Li$^+$, Na$^+$, or K$^+$.

An embodiment of the disclosure is a method for making a compound (I) having the structure,

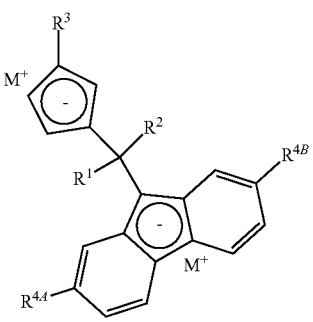

the method comprising combining in an ether solvent the following compounds in any order:

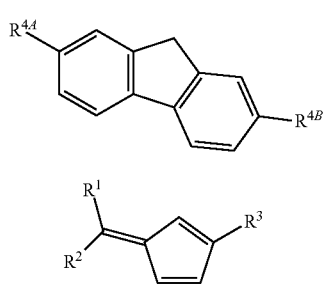

(i)

(ii)

and (iii) at least 2 molar equivalents of a metal salt of bis(trimethylsilyl)amide, $[M^+][N(SiMe_3)_2^-]$;
wherein $R^1$ and $R^2$ are independently an unsubstituted or substituted alkyl, aryl, or alkenyl group; $R^3$ is hydrogen, or an unsubstituted or substituted alkyl, aryl, or alkenyl group, or a substituted silyl group; $R^{4A}$ and $R^{4B}$ are independently a hydrocarbyl group, or hydrogen; and $M^+$ is $Li^+$, $Na^+$, or $K^+$.

An embodiment of the disclosure is a method for making a metallocene (II-Cl$_2$) having the structure,

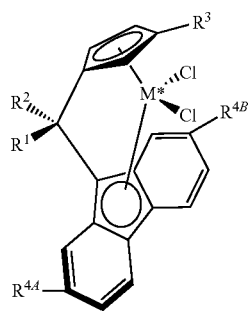

the method comprising forming a compound (I) having the structure,

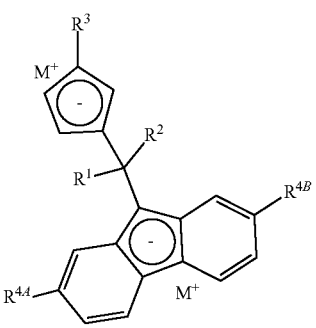

by combining in an ether solvent the following compounds in any order:

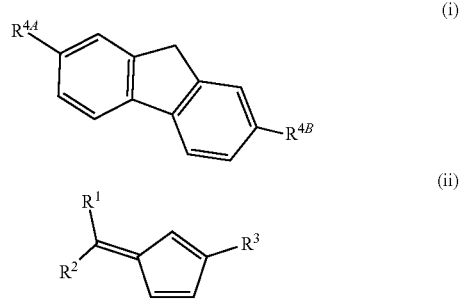

(i)

(ii)

and (iii) at least 2 molar equivalents of a metal salt of bis(trimethylsilyl)amide, $[M^+][N(SiMe_3)_2^-]$;

and then reacting the compound (I) with a Group IV transition metal chloride, $M^*Cl_4$;
wherein $R^1$ and $R^2$ are independently an unsubstituted or substituted alkyl, aryl, or alkenyl group; $R^3$ is hydrogen, or an unsubstituted or substituted alkyl, aryl, or alkenyl group, or a substituted silyl group; $R^{4A}$ and $R^{4B}$ are independently a hydrocarbyl group, or hydrogen; $M^+$ is $Li^+$, $Na^+$, or $K^+$, and $M^*$ is Ti, Zr, or Hf.

An embodiment of the disclosure is a method for making a metallocene (II-$R^5_2$) having the structure,

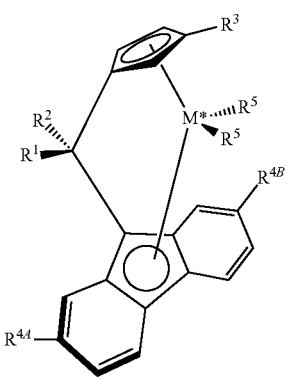

the method comprising forming a compound (I) having the structure, by combining in an ether solvent the following compounds in any order:

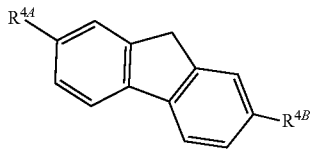

(i)

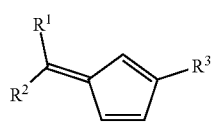

(ii)

and (iii) at least 2 molar equivalents of a metal salt of bis(trimethylsilyl)amide, $[M^+][N(SiMe_3)_2^-]$;

and then reacting the compound (I) with a Group IV transition metal chloride, $M^*Cl_4$ to give metallocene (II-$Cl_2$) having the structure,

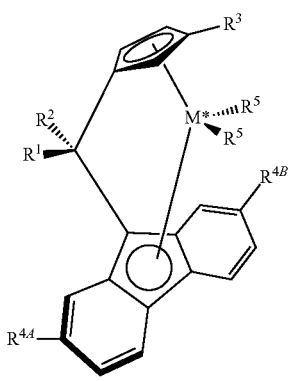

and then reacting the metallocene (II-$Cl_2$) with at least 2 molar equivalents of an alkylating reagent selected from the group comprising $R^5Li$ and $R^5MgBr$;
wherein $R^1$ and $R^2$ are independently an unsubstituted or substituted alkyl, aryl, or alkenyl group; $R^3$ is hydrogen, or an unsubstituted or substituted alkyl, aryl, or alkenyl group, or a substituted silyl group; $R^{4A}$ and $R^{4B}$ are independently a hydrocarbyl group, or hydrogen; $R^5$ is a methyl or a benzyl group, $M^+$ is $Li^+$, $Na^+$, or $K^+$, and $M^*$ is Ti, Zr, or Hf.

Definition of Terms

As used herein the terms "cyclopentadienyl/fluorenyl type", "cyclopentadienide/fluorenide type", "cyclopentadienide/fluorenyl type" or similar such terms are meant to connote a compound or ligand comprising a cyclopentadienyl moiety which may be unsubstituted or substituted and which is connected by a bridging group, —$CR^1R^2$— to a fluorenyl moiety which may be unsubstituted or substituted, and where the cyclopentadienyl moiety and/or the fluorenyl moiety may be in protonated form or in deprotonated, aromatic form.

As used herein, the terms "hydrocarbyl", "hydrocarbyl radical" or "hydrocarbyl group" refers to linear, branched, or cyclic, aliphatic, olefinic, acetylenic and aryl (aromatic) radicals comprising hydrogen and carbon that are deficient by one hydrogen.

As used herein, an "alkyl group" includes linear, branched and cyclic paraffin radicals that are deficient by one hydrogen radical; non-limiting examples include methyl (—$CH_3$) and ethyl (—$CH_2CH_3$) radicals. The term "alkenyl group" refers to linear, branched and cyclic hydrocarbons containing at least one carbon-carbon double bond that is deficient by one hydrogen radical.

As used herein, the term "aryl" group includes phenyl, naphthyl, pyridyl and other radicals whose molecules have an aromatic ring structure; non-limiting examples include naphthylene, phenanthrene and anthracene. An "arylalkyl" group is an alkyl group having an aryl group pendant there from; non-limiting examples include benzyl, phenethyl and tolylmethyl; an "alkylaryl" is an aryl group having one or more alkyl groups pendant there from; non-limiting examples include tolyl, xylyl, mesityl and cumyl.

As used herein the term "unsubstituted" means that hydrogen radicals are bounded to the molecular group that follows the term unsubstituted. The term "substituted" means that the group following this term possesses one or more moieties that have replaced one or more hydrogen radicals in any position within the group; non-limiting examples of moieties include halogen radicals (F, Cl, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, unsubstituted or substituted silyl groups and combinations thereof. Further non-limiting examples of substituted alkyls and aryls include: acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals and combinations thereof.

As used herein, a "substituted silyl group", is a silyl group having at least one hydrocarbyl radical, such as for example a trimethyl silyl group, —$SiMe_3$, or a triphenyl silyl group, —$SiPh_3$.

As used herein the term "Cp" represents a cyclopentadienyl, a cyclopentadiene, or a cyclopentadienide moiety while the term "Flu" represents a flourenyl, a fluorene, or a fluorinide moiety.

As used herein an "ether solvent" is an organic solvent compound that contains an oxygen connected to two hydrocarbyl groups such as for example two alkyl groups or aryl groups. Common examples of an ether solvent include diethyl ether and tetrahydrofuran, THF.

As used herein, the term "ambient conditions" is to mean room temperature conditions, or conditions under which the temperature of a reaction is not deliberately made to be lower or higher than room temperature conditions using cooling reagents, refrigeration methods, heating and the like.

DESCRIPTION OF EMBODIMENTS

A new one-pot method is described that allows for the synthesis a metallocene pre-polymerization catalyst (II-X$_2$) having the following structure:

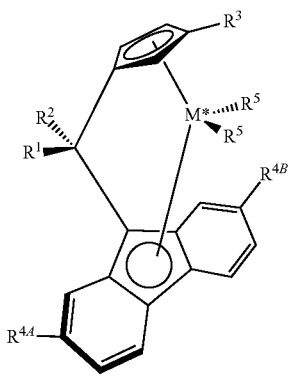

wherein R$^1$ and R$^2$ are independently an unsubstituted or substituted alkyl, aryl, or alkenyl group; R$^3$ is hydrogen, or an unsubstituted or substituted alkyl, aryl, or alkenyl group, or a substituted silyl group; R$^{4A}$ and R$^{4B}$ are independently a hydrocarbyl group, or hydrogen; M* is Ti, Zr, or Hf; and each X is a chloride, a methyl, or a benzyl group.

In an embodiment, the present method provides for a significant increase in overall yield of the metallocene pre-polymerization catalyst when compared to previously available literature methods. In an embodiment, the present method requires the use of fewer reaction vessels, one fewer equivalent of base, no isolation or purification of the precursor ligand, and no purification of a metallocene dichloride pre-polymerization catalyst.

In general, the synthesis of an ansa metallocene having a cyclopentadienyl/fluorenyl type ligand set, requires as a key step, the reaction of a fluorenide anion with a fulvene compound. A one-pot synthetic method that is adapted from the literature (see Alt, H. G. and Zenk, R. *J. Organomet. Chem.* 1996, 522, p 39 and Kaminsky, W.; Hopf, A.; Piel, C. *J. Organomet. Chem.* 2003, 684, p 200) is shown below in Scheme 1.

Scheme 1

1. n-BuLi, Et$_2$O, -78° C. to Room Temp., 8-12 h
2.

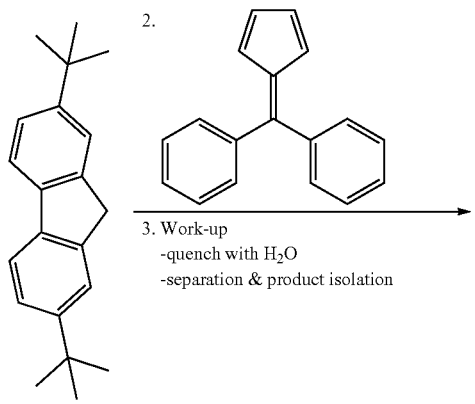

3. Work-up
   -quench with H$_2$O
   -separation & product isolation

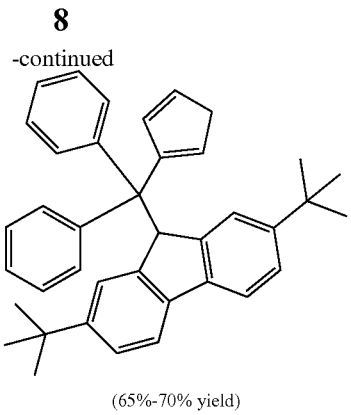

(65%-70% yield)

The cyclopentadienyl/fluorenyl type ligand formed in Scheme 1 exists as a mixture of double bond isomers and is worked up and isolated prior to a further deprotonation step and then reaction with a metal halide to form an ansa metallocene pre-polymerization catalyst. The method shown in Scheme 1, employed diether ether as a solvent.

If, instead, tetrahydrofuran (THF) is used as the reaction solvent, it has been found that ligands having the following substituent pattern could be obtained via a one-pot synthetic method as shown in Scheme 2 (see U.S. Pat. No. 7,468,452):

Scheme 2

1. n-BuLi, THF, -78° C. to RT, overnight
2.
3. R$^3$X

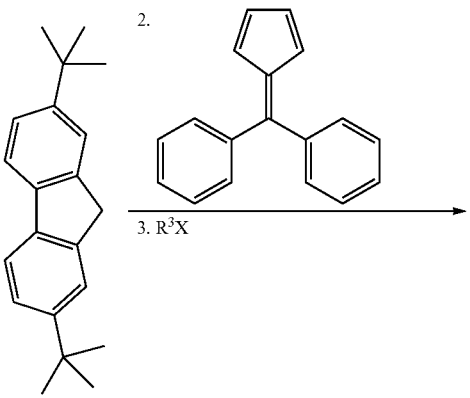

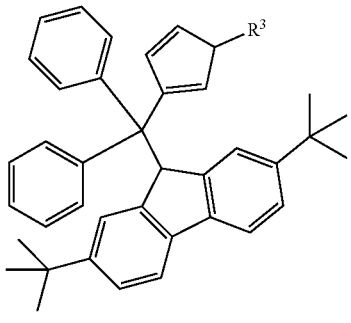

(as a mixture of isomers)

where R$^3$ is an alkyl, an alkenyl or a substituted silyl, any of which has up to 20 carbon atoms.

What is common to both of the above synthetic methods (Scheme 1 and Scheme 2) however, is the use of n-BuLi to carry out the deprotonation of the fluorene precursor prior to the reaction of the resulting fluorenide fragment with a fulvene compound. This reaction requires the use of low temperatures (e.g. −78° C.) and can lead to side reactions which negatively impact yield. Without wishing to be bound by theory, one of the factors affecting the yield and synthesis of the above compounds may be that there is an incomplete reaction between the lithium 2,7-di-tert-butylfluorenide Li[2,7-tBu$_2$-Flu] (b) and diphenylfulvene (c) as shown in Scheme 3 below:

This deprotonation-protonation equilibrium would prevent the complete conversion of Li[2,7-tBu$_2$-Flu] (b) and diphenylfulvene (c) to the desired Li[Ph$_2$C(Cp)(2,7-tBu$_2$-Flu)] (d) compound.

To resolve this issue, an alternative base was sought which would react selectively with a fluorene compound and a mono-metallo salt such as Li[Ph$_2$C(Cp)(2,7-tBu$_2$-Flu)],

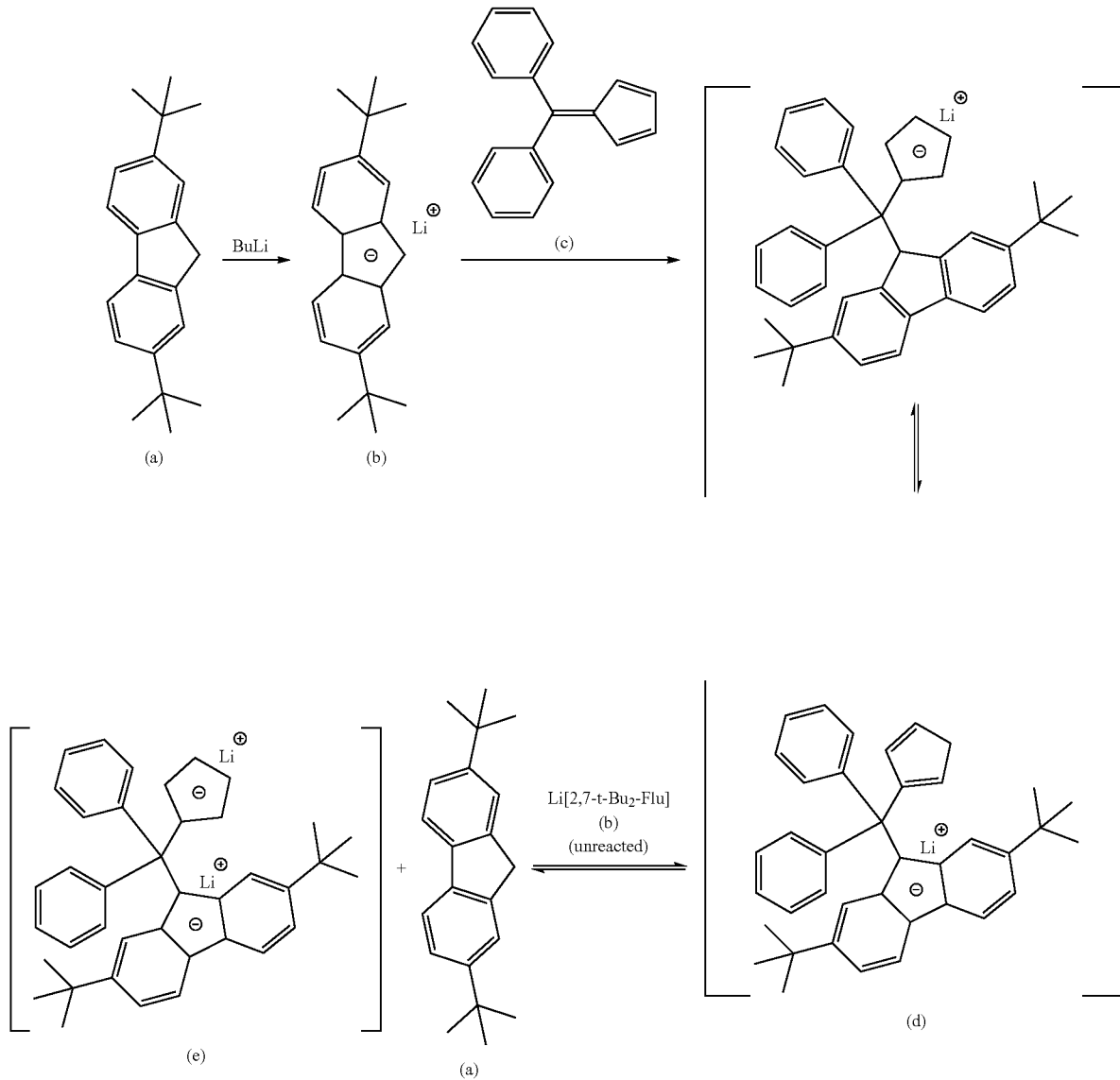

It is believed that, a deprotonation-protonation equilibrium exists between fluorene (a), Li[2,7-tBu$_2$-Flu] (b) and the desired mono-lithium salt, Li[Ph$_2$C(Cp)(2,7-tBu$_2$-Flu)] (d). The Li[Ph$_2$C(Cp)(2,7-tBu$_2$-Flu)] salt (d) could be further deprotonated by unreacted Li[2,7-tBu$_2$-Flu] (b) to form the di-lithio salt (Li$_2$[Ph$_2$C(Cp)(2,7-tBu$_2$-Flu)]) (e) and fluorene (a) during the reaction. Further, the in situ generated fluorene could be deprotonated by either the salts, Li[Ph$_2$C(Cp)(2,7-tBu$_2$-Flu)] (d) or Li$_2$[Ph$_2$C(Cp)(2,7-tBu$_2$-Flu)] (e).

but not with diphenylfulvene. If such a base could be found, then the use of at least 2 molar equivalents to carry out the deprotonation of (a) could help facilitate the second deprotonation of (d) over the reaction of (d) with unreacted (b), when (d) is formed by addition of a fulvene compound. In this regard, the reactivity of three bases toward diphenylfulvene and di-tertbutylfluorene was compared and the results are shown below in Table 1.

TABLE 1[NOTE 1]

| Base | Reactivity towards diphenylfulvene | Reactivity towards di-tert-butylfluorene |
|---|---|---|
| Na+ −O−C(CH3)3 "sodium tert-butoxide" | not reactive | not reactive |
| Li+ −N(iPr)2 "lithium di-isopropyl amide" | reactive | not tested |
| K+ −N(TMS)2 "potassium bis(trimethylsilyl)amide" | not reactive | reactive |

Note 1:
A stoichiometric amount of base and the respective substrate were used in the reactivity tests.

As shown in Table 1, sodium tert-butoxide did not react with diphenylfulvene nor did it deprotonate the 2,7-di-tert-butylfluorene. Lithium di-isopropyl amide (LDA) on the other hand reacted with diphenylfulvene, which was not desirable. Potassium bis(trimethylsilyl)amide, $KN(SiMe_3)_2$ was unreactive towards diphenylfulvene but deprotonated di-tert-butylfluorene cleanly. The potassium bis(trimethylsilyl)amide, $KN(SiMe_3)_2$ was therefore chosen for the synthesis of a cyclopentadienyl/fluorenyl ligand frame and for the synthesis of the corresponding ansa-metallocene pre-polymerization catalysts.

We note that in Chinese Pat. No. 105646741, LiN(SiMe$_3$)$_2$ was included within a list of so called "strong alkali metal" bases which could be used to deprotonate a fluorene precursor on route to making an ansa-zirconocene catalyst. However, in each of the examples provided in the patent, n-BuLi was employed to deprotonate a fluorene molecule. The patent does not exemplify or discuss any advantages a person skilled in the art could realize by using $KN(SiMe_3)_2$ specifically, relative to other readily available bases, which were listed as "strong alkali metal" bases in the patent. Namely, that the reactivity of $KN(SiMe_3)_2$ was especially selective and that it could be used at ambient conditions: we found that $KN(SiMe_3)_2$ reacted with a fluorene compound such as 2,7-di-tert-butylfluorene at room temperature, while failing to react with a fulvene compound such as diphenylfulvene (see Table 1).

In an embodiment of the disclosure, treatment of 2,7-di-tert-butylfluorene with at least 2 molar equivalents of $KN(SiMe_3)_2$ in tetrahydrofuran (THF), at ambient temperature, followed by addition of this mixture to diphenylfulvene in THF at room temperature gave the di-potassium salt, $K_2[Ph_2C(Cp)(2,7-tBu_2-Flu]$, in greater than 90% conversion (by $^1H$ NMR spectroscopy after quenching with water) as shown in Scheme 4.

Scheme 4

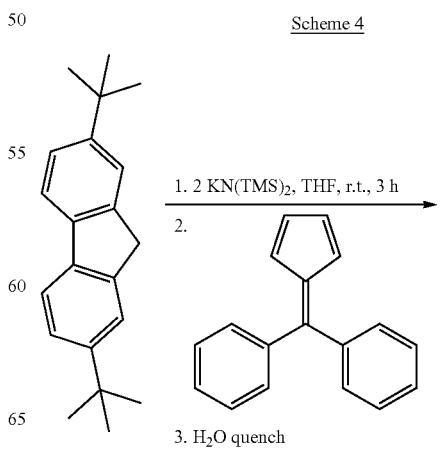

1. 2 KN(TMS)$_2$, THF, r.t., 3 h
2.
3. H$_2$O quench

-continued

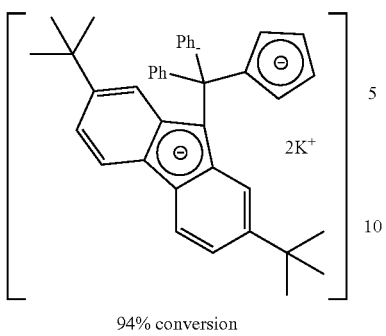

94% conversion

Without wishing to be bound by theory, addition of the two equivalents of KN(SiMe$_3$)$_2$ at the beginning of the reaction ensures that the K$_2$[Ph$_2$C(Cp)(2,7-tBu$_2$-Flu)] salt is the only product of this reaction.

In an embodiment of the disclosure, the K$_2$[Ph$_2$C(Cp)(2,7-tBu$_2$-Flu)] salt was prepared by combining 2,7-di-tert-butylfluorene, diphenylfulvene, and at least 2 molar equivalents of KN(SiMe$_3$)$_2$ in any order in the presence of an ether solvent. In another embodiment of the disclosure, the K$_2$[Ph$_2$C(Cp)(2,7-tBu$_2$-Flu)] salt was prepared by combining 2,7-di-tert-butylfluorene, diphenylfulvene, and at least 2 molar equivalents of KN(SiMe$_3$)$_2$ in any order in the presence of an ether solvent and at ambient temperature. In yet another embodiment of the disclosure, the K$_2$[Ph$_2$C(Cp)(2,7-tBu$_2$-Flu)] salt was prepared by combining 2,7-di-tert-butylfluorene, diphenylfulvene, and at least 2 molar equivalents of KN(SiMe$_3$)$_2$ in any order in the presence of tetrahydrofuran, THF and at ambient temperature. In still yet another embodiment of the disclosure, the K$_2$[Ph$_2$C(Cp)(2,7-tBu$_2$-Flu)] salt was prepared in greater than 85% yield (by $^1$H NMR spectroscopy), by combining 2,7-di-tert-butylfluorene, diphenylfulvene, and at least 2 molar equivalents of KN(SiMe$_3$)$_2$ in any order in the presence of tetrahydrofuran, THF and at ambient temperature.

In an embodiment of the disclosure, the K$_2$[Ph$_2$C(Cp)(2,7-tBu$_2$-Flu)] salt was prepared in greater than 90% yield (by $^1$H NMR spectroscopy), by combining 2,7-di-tert-butylfluorene, diphenylfulvene, and at least 2 molar equivalents of KN(SiMe$_3$)$_2$ in any order in the presence of tetrahydrofuran, THF and at ambient temperature.

In an embodiment of the disclosure, a compound (I) having the structure,

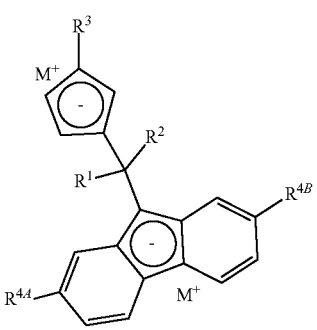

is made by combining in an ether solvent the following compounds in any order:

(ii)

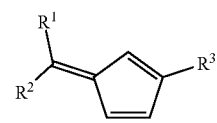

and (iii) at least 2 molar equivalents of a metal salt of bis(trimethylsilyl)amide, [M$^+$][N(SiMe$_3$)$_2$$^-$], wherein R$^1$ and R$^2$ are independently an unsubstituted or substituted alkyl, aryl, or alkenyl group; R$^3$ is hydrogen, or an unsubstituted or substituted alkyl, aryl, or alkenyl group, or a substituted silyl group; R$^{4A}$ and R$^{4B}$ are independently a hydrocarbyl group, or hydrogen; and M$^+$ is Li$^+$, Na$^+$, or K$^+$.

In an embodiment of the disclosure, a metallocene (II-Cl$_2$) having the structure, is made by first forming a compound (I) having the structure,

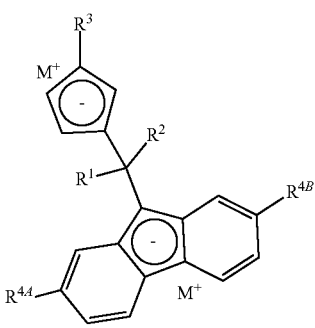

by combining in an ether solvent the following compounds in any order:

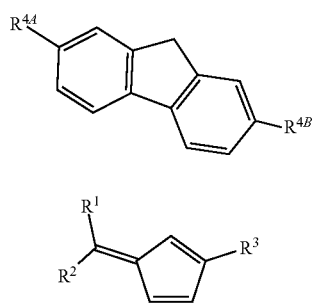
(i)

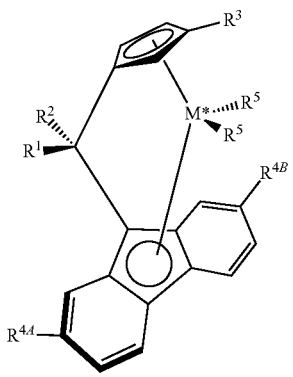
(ii)

and (iii) at least 2 molar equivalents of a metal salt of bis(trimethylsilyl)amide, $[M^+][N(SiMe_3)_2^-]$;

and then reacting the compound (I) with a Group IV transition metal chloride, $M^*Cl_4$; wherein $R^1$ and $R^2$ are independently an unsubstituted or substituted alkyl, aryl, or alkenyl group; $R^3$ is hydrogen, or an unsubstituted or substituted alkyl, aryl, or alkenyl group, or a substituted silyl group; $R^{4A}$ and $R^{4B}$ are independently a hydrocarbyl group, or hydrogen; $M^+$ is $Li^+$, $Na^+$, or $K^+$, and $M^*$ is Ti, Zr, or Hf.

In an embodiment of the disclosure, a metallocene (II-$R^5_2$) having the structure,

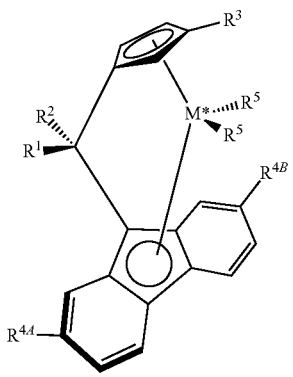

is made by first forming a compound (I) having the structure,

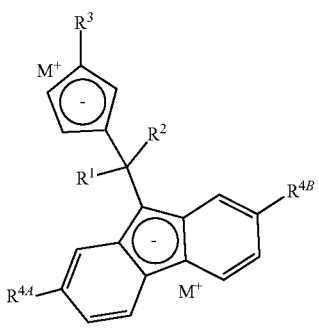

by combining in an ether solvent the following compounds in any order:

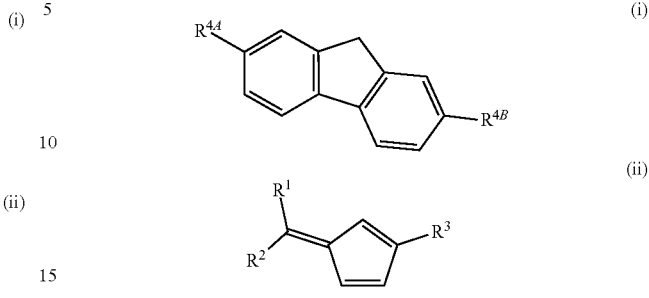

and (iii) at least 2 molar equivalents of a metal salt of bis(trimethylsilyl)amide, $[M^+][N(SiMe_3)_2^-]$;

and then reacting the compound (I) with a Group IV transition metal chloride, $M^*Cl_4$ to give metallocene (II-$Cl_2$) having the structure,

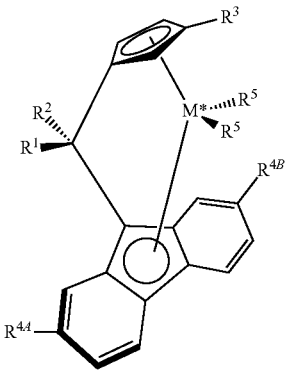

and then reacting the metallocene (II-$Cl_2$) with at least 2 molar equivalents of an alkylating reagent selected from the group comprising $R^5Li$ and $R^5MgBr$; wherein $R^1$ and $R^2$ are independently an unsubstituted or substituted alkyl, aryl, or alkenyl group; $R^3$ is hydrogen, or an unsubstituted or substituted alkyl, aryl, or alkenyl group, or a substituted silyl group; $R^{4A}$ and $R^{4B}$ are independently a hydrocarbyl group, or hydrogen; $R^5$ is a methyl, or a benzyl group, $M^+$ is $Li^+$, $Na^+$, or $K^+$, and $M^*$ is Ti, Zr, or Hf.

In embodiments of the disclosure, a metallocene (II-$R^5_2$) is made from a metallocene (II-$Cl_2$) by reacting the metallocene (II-$Cl_2$) with at least 2.5 molar equivalents, or at least 3.0 molar equivalents, or at least 3.5 molar equivalents, or at least 4.0 molar equivalents of an alkylating reagent selected from the group comprising $R^5Li$ and $R^5MgBr$, where $R^5$ is a methyl, or a benzyl group.

In an embodiment, $R^1$ and $R^2$ are independently an aryl group.

In an embodiment, $R^1$ and $R^2$ are independently a phenyl group or a substituted phenyl group.

In an embodiment, $R^1$ and $R^2$ are a phenyl group.

In an embodiment, $R^1$ and $R^2$ are independently a substituted phenyl group.

In an embodiment, $R^1$ and $R^2$ are a substituted phenyl group, wherein the phenyl group is substituted with a substituted silyl group.

In an embodiment, $R^1$ and $R^2$ are a substituted phenyl group, wherein the phenyl group is substituted with a trialkyl silyl group.

In an embodiment, $R^1$ and $R^2$ are a substituted phenyl group, wherein the phenyl group is substituted at the para position with a trialkylsilyl group. In an embodiment, $R^1$ and $R^2$ are a substituted phenyl group, wherein the phenyl group is substituted at the para position with a trimethylsilyl group. In an embodiment, $R^1$ and $R^2$ are a substituted phenyl group, wherein the phenyl group is substituted at the para position with a triethylsilyl group.

In an embodiment, $R^1$ and $R^2$ are independently an alkyl group.

In an embodiment, $R^1$ and $R^2$ are independently an alkenyl group.

In an embodiment, $R^3$ is hydrogen.

In an embodiment, $R^3$ is an alkyl group.

In an embodiment, $R^3$ is an aryl group.

In an embodiment, $R^3$ is an alkenyl group.

In an embodiment, $R^{4A}$ and $R^{4B}$ are independently a hydrocarbyl group having from 1 to 30 carbon atoms.

In an embodiment, $R^{4A}$ and $R^{4B}$ are independently an aryl group.

In an embodiment, $R^{4A}$ and $R^{4B}$ are independently an alkyl group.

In an embodiment, $R^{4A}$ and $R^{4B}$ are independently an alkyl group having from 1 to 20 carbon atoms.

In an embodiment, $R^{4A}$ and $R^{4B}$ are independently a phenyl group or a substituted phenyl group.

In an embodiment, $R^{4A}$ and $R^{4B}$ are a tert-butyl group.

In an embodiment, $R^{4A}$ and $R^{4B}$ are hydrogen.

In an embodiment, each $R^5$ is methyl.

In an embodiment, each $R^5$ is benzyl.

In an embodiment M* is hafnium, Hf.

In an embodiment M* is zirconium, Zr.

In an embodiment of the disclosure, the compound (I) is made in the presence of an ether solvent. In an embodiment, the compound (I) is made in the presence of diethyl ether. In an embodiment, the compound (I) is made in the presence of tetrahydrofuran (THF).

In an embodiment of the disclosure, the compound (I) is made at ambient (i.e. room temperature).

In an embodiment of the disclosure, the compound (I) is made in a single reaction vessel.

In an embodiment of the disclosure, the compound (I) is made in a single reaction vessel in greater than 85% percent yield. In another embodiment of the disclosure, the compound (I) is made in a single reaction vessel in greater than 90% percent yield.

In an embodiment of the disclosure, the compound (I) is made in a single reaction vessel, at ambient temperature, in greater than 85% percent yield. In another embodiment of the disclosure, the compound (I) is made in a single reaction vessel, at ambient temperature, in greater than 90% percent yield.

In an embodiment of the disclosure, the metallocene (II-Cl$_2$) is made at ambient (i.e. room temperature).

In an embodiment of the disclosure, the metallocene (II-Cl$_2$) is made in a single reaction vessel.

In an embodiment of the disclosure, the metallocene (II-Cl$_2$) is made in a single reaction vessel in greater than 50% overall yield. In an embodiment of the disclosure, the metallocene (II-Cl$_2$) is made in a single reaction vessel in greater than 60% overall yield. In an embodiment of the disclosure, the metallocene (II-Cl$_2$) is made in a single reaction vessel in at least 70% overall yield.

In an embodiment of the disclosure, the metallocene (II-Cl$_2$) is made in a single reaction vessel, at ambient temperature, in greater than 50% overall yield. In an embodiment of the disclosure, the metallocene (II-Cl$_2$) is made in a single reaction vessel, at ambient temperature, in greater than 60% overall yield. In an embodiment of the disclosure, the metallocene (II-Cl$_2$) is made in a single reaction vessel, at ambient temperature, in at least 70% overall yield.

In an embodiment of the disclosure, the metallocene (II-R$^5_2$) is made at ambient (i.e. room temperature).

In an embodiment of the disclosure, the metallocene (II-R$^5_2$) is made in a single reaction vessel.

In an embodiment of the disclosure, the metallocene (II-R$^5_2$) is made in a single reaction vessel in greater than 50% overall yield. In an embodiment of the disclosure, the metallocene (II-R$^5_2$) is made in a single reaction vessel in greater than 60% overall yield. In an embodiment of the disclosure, the metallocene (II-R$^5_2$) is made in a single reaction vessel in at least 70% overall yield.

In an embodiment of the disclosure, the metallocene (II-R$^5_2$) is made in a single reaction vessel, at ambient temperature, in greater than 50% overall yield. In an embodiment of the disclosure, the metallocene (II-R$^5_2$) is made in a single reaction vessel, at ambient temperature, in greater than 60% overall yield. In an embodiment of the disclosure, the metallocene (II-R$^5_2$) is made in a single reaction vessel, at ambient temperature, in at least 70% overall yield.

The present disclosure is further illustrated by the following examples, which are not to be construed in any way as imposing limitations upon the scope thereof. It is to be understood that use of other aspects, embodiments, modifications, and equivalents thereof which, after reading the description herein, may suggest themselves to a person of ordinary skill in the art without departing from the spirit of the present disclosure or the scope of the claims.

EXAMPLES

General Experimental Methods

All reactions were performed under nitrogen using standard Schlenk techniques or in an inert atmosphere glovebox. All solvents were purified by the system described by Grubbs et al (see Pangborn, A. B.; Giaradello, M. A.; Grubbs, R. H.; Rosen, R. K.; Timmers, F. *J. Organometallics* 1996, 15, 1518-1520) and then stored over activated 13× molecular sieves in either a Kontes flask or in an inert atmosphere glovebox. 2,7-Di-tert-butylfluorene, diphenylfulvene, nBuLi, potassium trimethylsilylamide, sodium tert-butoxide and methylmagnesium bromide were used as received from Sigma Aldrich. Deuterated solvents (tetrahydrofuran-d$_8$, toluene-d$_8$) were purchased from Aldrich and stored over 4 Å molecular sieves. Deuterated solvent (dichloromethane-d$_2$) were purchased from Cambridge Isotope and stored over 4 Å molecular sieves. NMR spectra were recorded on a Bruker 400 MHz spectrometer ($^1$H: 400.1 MHz).

The Reactivity Tests of Bases with Diphenylfulvene or 2,7-Di-Tert-Butylfluorene (a) Potassium bis(trimethylsilyl)amide (0.087 g, 0.44 mmol) in 3 mL THF was added to diphenylfulvene (0.1 g, 0.4 mmol) in 6 mL THF. The mixture turned dark red. The signals in the $^1$H NMR spectrum were broadened but remained similar to those of diphenylfulvene.

(b) Lithium diisopropylamide (0.047 g, 0.44 mmol) in 3 mL THF was added to diphenylfulvene (0.1 g, 0.4 mmol) in 6 mL. The mixture turned dark brown. There were numerous signals in the $^1$H NMR spectrum indicating a reaction had occurred.

(c) A solution of sodium tert-butoxide (0.087 g, 0.44 mmol) in 3 mL THF was added to diphenylfulvene (0.1 g, 0.4 mmol) in 6 mL. The mixture remained clear. The signals in the $^1$H NMR spectrum remained that of the unreacted reagents.

(d) Potassium bis(trimethylsilyl)amide (0.069 g, 0.35 mmol) in 3 mL in THF was added to 2,7-di-tert-butylfluorene (0.097 g, 0.35 mmol) in 6 mL THF. The mixture turned orange. Analysis by $^1$H NMR showed 60% conversion to a potassium 2,7-di-tert-butylfluorenide salt.

(e) Sodium tert-butoxide (0.035 g, 0.36 mmol) in 3 mL in THF was added to 2,7-di-tert-butylfluorene (0.11 g, 0.36 mmol) in 6 mL THF. The mixture remained colourless. Analysis by $^1$H NMR showed signals for the unreacted reagents.

Synthesis of Compound I:

Example 1: Potassium bis(trimethylsilyl)amide (4.17 g; 21.0 mmol; 2.00 equiv) in THF (14 mL) was added dropwise over 5 minutes to a solution of 2,7-di-tert-butylfluorene (2.93 g; 10.6 mmol; 1.00 equiv.) in THF (34 mL) at ambient temperature. The hypovial was rinsed with 3×3 mL of THF and the rinses transferred to the reaction mixture. The reaction was stirred at ambient temperature for 3 hours. This salt solution was added dropwise to diphenylfulvene (2.55 g; 11.1 mmol; 1.10 equiv.) in THF (30 mL) in 12 minutes. The hypovial was rinsed with 3×10 mL of THF and the rinses transferred to the reaction mixture, which was then stirred for 72 hours to give compound I. Compound I was worked up into a mixture of double bond isomeric forms, by addition of 2.0 mL of water and 10 g of sodium sulfate, followed by stirring for 30 minutes. The reaction was filtered via gravity filtration and the filtrate was reduced to a red solid. The $^1$H NMR (CD$_2$Cl$_2$) is consistent with a mixture of isomeric double bond forms of Ph$_2$C(Cp)(2,7-tBu$_2$-Flu).

Example 2: Potassium bis(trimethylsilyl)amide (4.22 g; 21.0 mmol; 2.00 equiv) in THF (15 mL) was added dropwise within 10 minutes to a solution of 2,7-di-tert-butylfluorene (2.93 g; 10.6 mmol; 1.00 equiv.) in THF (30 mL) at ambient temperature. The hypovial was rinsed with 3×3 mL of THF and the rinses transferred to the reaction mixture. The reaction was stirred at ambient temperature for 3 hours. Diphenylfulvene (2.55 g; 11.1 mmol; 1.10 equiv.) in THF (45 mL) was added dropwise to the mixture over 11 minutes. The hypovial was rinsed with 3×10 mL of THF and rinses transferred to the reaction mixture. The reaction was stirred at ambient temperature for 15 hours. An aliquot was taken and analyzed by $^1$H NMR. The conversion to the desired product was found to be 89%. The $^1$H NMR is consistent with the structure of K$_2$[Ph$_2$C(Cp)(2,7-tBu$_2$-Flu)]. ($^1$H NMR, THF-d$_8$, δ): 8.04 m, 4H; 7.44 m, 2H; 7.03 m, 5H; 6.90 m, 2H; 6.67 s, 2H; 6.43 m, 2H; 6.01 brs, 2H; 5.37 brs, 2H; 1.14 s, 18H.

Synthesis of Metallocene II-Cl$_2$:

Example 3: Hafnium tetrachloride, HfCl$_4$ (3.39 g; 10.5 mmol; 1.00 equiv.) in a THF (40 mL)-toluene (10 mL) solvent mixture was added to the di-potassium salt solution (prepared as directly above, Compound I, Example 2) at ambient temperature over 20 minutes. The reaction was stirred for 4 hours after which all volatiles were removed to give a yellow solid, which was slurried in heptane (200 mL) and then dried in vacuo. The resulting solid was extracted with toluene (200 mL) and filtered through Celite. The toluene filtrate was evaporated to dryness to give an orange solid. The solid was slurried in heptane (150 mL) and filtered through a frit. After removing all the volatiles, the yellow solid (4.23 g, 53% overall yield) was collected. ($^1$H NMR, tol-d$_8$, δ): 7.88 (d, J=8.8 Hz, 2H); 7.71 (d, J=7.9 Hz, 2H); 7.50 (d, J=8.8 Hz, 2H); 7.47 (d, J=8.0 Hz, 2H); 7.09 m, 6H); 6.44 brs, 2H; 6.09 (dd, J=2.6, 2.7 Hz, 2H); 5.62 (dd, J=2.6, 2.7 Hz, 2H); 1.10 s, 18H.

Example 4 (One Pot Synthesis): Potassium bis(trimethylsilyl)amide (4.17 g; 21.0 mmol; 2.00 equiv) in THF (14 mL) was added dropwise over 11 minutes to a solution of 2,7-di-tert-butylfluorene (2.93 g; 10.5 mmol; 1.00 equiv.) and diphenylfulvene (2.55 g, 11.1 mmol; 1.10 equiv.) in THF (100 mL) at ambient temperature. The hypovial was rinsed with 3×5 mL of THF and the rinses transferred to the reaction mixture. The reaction was stirred at ambient temperature for 1 hour before an aliquot was taken, dried and analyzed by $^1$H NMR to determine that the reaction was complete. Hafnium tetrachloride (3.36 g; 10.5 mmol; 1.00 equiv.) in a THF (20 mL)-toluene (15 mL) mixed solvent, was added to the di-potassium salt solution over 4 minutes (note: the solution of HfCl$_4$ was prepared by adding THF to a slurry of the hafnium precursor in toluene). The hypovial was rinsed 3×5 mL of THF and the rinses transferred to the reaction mixture. The reaction was stirred at ambient temperature for 1 hour. All volatiles were removed to yield a yellow solid. The yellow residue was slurried in heptane (200 mL) and dried in vacuo. The solid was then extracted in toluene (200 mL) and filtered through Celite. The toluene filtrate was reduced to an orange solid. The solid was slurried in heptane (150 mL) and filtered through a frit. After all volatiles were removed, the yellow solid (5.16 g, 65% overall yield) was collected. Attempts to extract more product from the filtrate were unsuccessful. ($^1$H NMR, tol-d$_8$, δ): 7.88 (d, J=8.8 Hz, 2H); 7.71 (d, J=7.9 Hz, 2H); 7.50 (d, J=8.8 Hz, 2H); 7.47 (d, J=8.0 Hz, 2H); 7.09 m, 6H); 6.44 brs, 2H; 6.09 (dd, J=2.6, 2.7 Hz, 2H); 5.62 (dd, J=2.6, 2.7 Hz, 2H); 1.10 s, 18H.

Example 5 (One Pot Synthesis with Small Excess of Base): Potassium bis(trimethylsilyl)amide (4.61 g; 23.1 mmol; 2.20 equiv) in THF (14 mL) was added dropwise over 6 minutes to 2,7-di-tert-butylfluorene (2.93 g; 10.5 mmol; 1.00 equiv.) and diphenylfulvene (2.55 g, 11.1 mmol; 1.10 equiv.) in THF (100 mL) at ambient temperature. The hypovial was rinsed with 3×5 mL of THF and the rinses transferred to the reaction mixture. The reaction was stirred for 1 hour before an aliquot was taken, dried and analyzed by $^1$H NMR to determine the conversion (60%). The reaction was stirred for an additional 3 hours and a second aliquot was taken and analyzed and shown to have gone to completion. Hafnium tetrachloride (3.36 g; 10.5 mmol; 1.00 equiv.) in THF (100 mL)-toluene (10 mL) solvent mixture, was added to the di-potassium salt solution over 10 minutes (note: the solution of HfCl$_4$ was prepared by adding THF to a slurry of the hafnium precursor in toluene). The hypovial was rinsed 3×5 mL of THF and the rinses transferred to the reaction mixture. The reaction was stirred at ambient temperature for 2 hours after which the solvent was removed to yield a yellow solid. The solid was slurried in toluene (200 mL) and dried in vacuo. The solid was then slurried in heptane, filtered through Celite and dried in vacuo to afford 4.12 g (52% overall yield) of the desired compound. Attempts to extract more product from the filtrate were unsuccessful. ($^1$H NMR, tol-d$_8$, δ): 7.88 (d, J=8.8 Hz, 2H); 7.71 (d, J=7.9 Hz, 2H); 7.50 (d, J=8.8 Hz, 2H); 7.47 (d, J=8.0 Hz, 2H); 7.09 m, 6H); 6.44 brs, 2H; 6.09 (dd, J=2.6, 2.7 Hz, 2H); 5.62 (dd, J=2.6, 2.7 Hz, 2H); 1.10 s, 18H.

Example 6 (Scaled Up, One Pot Synthesis): Potassium bis(trimethylsilyl)amide (31.8 g; 160 mmol; 2.00 equiv) in THF (110 mL) was added dropwise over 35 minutes to 2,7-di-tert-butylfluorene (22.2 g; 79.8 mmol; 1.00 equiv.) and diphenylfulvene (20.22 g, 87.8 mmol; 1.10 equiv.) in THF (1000 mL) at ambient temperature. The hypovial was rinsed with 2×20 mL of THF and the rinses transferred to the reaction mixture. During this addition the reaction temperature increased by 0.8° C. (from 20.8° C. to 21.6° C.). The reaction was stirred for 80 minutes before an aliquot was taken, dried and analyzed by $^1$H NMR to determine the conversion (91%) to $K_2[Ph_2C(Cp)(2,7-tBu_2-Flu]$. Hafnium tetrachloride (25.6 g; 79.8 mmol; 1.00 equiv.) in THF (300 mL)-toluene (110 mL) solvent mixture, was added to the di-potassium salt solution at ambient temperature over 40 minutes (note: the solution of $HfCl_4$ was prepared by adding THF to a slurry of the hafnium precursor in toluene). The hypovial was rinsed with THF (2×20 mL) and the rinses transferred to the reaction mixture. The reaction was stirred for 17 hours, after which all the volatiles was removed to yield a yellow solid, which was slurried in toluene (250 mL) and dried in vacuo. The solid was then slurried in toluene (300 mL) and filtered through Celite. The filter cake was washed with additional toluene (2×15 mL). The combined toluene filtrate was evaporated to dryness. The solid was slurried in heptane (300 mL) and filtered through a frit. After all volatiles were removed, a yellow solid (36.38 g, 60% overall yield) was collected. Attempts to extract more product from the residue were unsuccessful. ($^1$H NMR, tol-$d_8$, δ): 7.88 (d, J=8.8 Hz, 2H); 7.71 (d, J=7.9 Hz, 2H); 7.50 (d, J=8.8 Hz, 2H); 7.47 (d, J=8.0 Hz, 2H); 7.09 m, 6H); 6.44 brs, 2H; 6.09 (dd, J=2.6, 2.7 Hz, 2H); 5.62 (dd, J=2.6, 2.7 Hz, 2H); 1.10 s, 18H.

Synthesis of Metallocene II-Me$_2$:

Example 7. Methylmagnesium bromide, MeMgBr (6.5 mL of 3.0 M solution in ether, 19.4 mmol, 3.50 equiv.) was added to metallocene II-Cl$_2$ (4.23 g; 5.55 mmol; 1.00 equiv.) in toluene (200 mL) at ambient temperature within 1 minute. The reaction was stirred for 1 hour at ambient temperature before an aliquot was taken for analysis by $^1$H NMR. The analysis showed full conversion to the desired dimethyl product. The volatiles were removed, and the brown residue was slurried in toluene (100 mL) and dried. The solid was re-slurried in a toluene (100 mL)-heptane (100 mL) mixture, filtered through Celite and the filter cake was washed with additional solvent mixture (3×10 mL). The combined filtrate was reduced to a yellow solid (3.59 g, 90% yield for this step). ($^1$H NMR, tol-$d_8$, δ): 7.98 (d, J=8.8 Hz, 2H); 7.85 (d, J=6.6 Hz, 2H); 7.53 (d, J=8 Hz, 2H); 7.41 (d, J=8.8 Hz, 2H); 6.38 s, 2H; 6.08 (dd, J=2.60, 2.64 Hz, 2H); 5.51 (dd, J=2.64, 2.62 Hz, 2H); 1.09 s 18H; −1.46 s 6H.

Example 8 (One Pot Synthesis): Potassium bis(trimethylsilyl)amide (4.61 g; 23.1 mmol; 2.20 equiv) in THF (14 mL) was added dropwise over 6 minutes to 2,7-di-tert-butylfluorene (2.93 g; 10.5 mmol; 1.00 equiv.) and diphenylfulvene (2.55 g, 11.1 mmol; 1.10 equiv.) in THF (100 mL) at ambient temperature. The hypovial containing the amide salt was rinsed with THF (3×5 mL) and the rinses transferred to the reaction mixture. The reaction was stirred at ambient temperature for 1 hour before an aliquot was taken, dried and then analyzed by $^1$H NMR to determine that the reaction was complete. Hafnium tetrachloride (3.36 g; 10.5 mmol; 1.00 equiv.) in a THF (90 mL):toluene (10 mL) solvent mixture was added to the reaction mixture over 5 minutes (note: to make the $HfCl_4$ solution, tetrahydrofuran (100 mL) which was at 0° C. was added dropwise to a solution of hafnium tetrachloride (3.36 g; 10.5 mmol; 1.00 equiv.) in a THF (90 mL):toluene (10 mL) mixture over 10 minutes; the hafnium tetrachloride solution was allowed to warm to ambient temperature over 2 hours). The hypovial was rinsed with THF (3×5 mL) and the rinses transferred to the reaction mixture. The reaction was stirred for 1 hour after which all the volatiles (including the species $HN(SiMe_3)_2$) were removed at 40° C. and 300 mTorr to give a yellow solid. The solid was dissolved in THF (200 mL) and methylmagnesium bromide (12.2 mL of 3 M, 3.5 equiv.) was then added dropwise over 5 minutes to the mixture. The reaction was stirred for 1 hour after which all the volatiles were removed to give a yellow solid. The orange solid was slurried in toluene (100 mL) and dried under vacuum. The solid was slurried in a toluene (75 mL)-heptane (75 mL), filtered through Celite and filter cake was washed with 3×20 mL of the solvent mixture. The combined filtrate was evaporated to dryness to give a yellow solid, which was then washed with pentane (30 mL) and dried to give a yellow solid (5.35 g, 71% overall yield). ($^1$H NMR, tol-ds, 6): 7.98 (d, J=8.8 Hz, 2H); 7.85 (d, J=6.6 Hz, 2H); 7.53 (d, J=8 Hz, 2H); 7.41 (d, J=8.8 Hz, 2H); 6.38 s, 2H; 6.08 (dd, J=2.60, 2.64 Hz, 2H); 5.51 (dd, J=2.64, 2.62 Hz, 2H); 1.09 s 18H; −1.46 s 6H.

Example 9 (Scaled Up, One Pot Synthesis): To a solution of 2,7-di-tert-butylfluorene (22.3 g; 80.0 mmol; 1.00 equiv.) and diphenylfulvene (20.2 g, 88 mmol; 1.10 equiv.) in THF (500 mL) at ambient temperature was added a solution of potassium trimethylsilylamide (35.1 g; 176 mmol; 2.20 equiv) in THF (140 mL) dropwise over 12 minutes at a rate of 2.33 mL/min. The hypovial was rinsed with 3×5 mL of THF. The reaction was stirred at ambient temperature over 3 hours. At 0° C., tetrahydrofuran (100 mL) was added dropwise to a solution of hafnium tetrachloride (25.6 g; 10.5 mmol; 1.00 equiv.) in toluene (50 mL) over 10 minutes. The hafnium tetrachloride THF adduct solution was allowed to warm to room temperature over 1 hour. The hafnium tetrachloride THF adduct solution was added to the potassium salt solution at ambient temperature over 15 minutes. The hypovial was rinsed 3×5 mL of THF. The reaction was stirred at ambient temperature for 2 hours. The volatiles were removed at ambient temperature to yield an orange solid. The orange solid was slurried in THF (200 mL). At ambient temperature, 93 mL of methylmagnesium bromide (3.0 M in ether, 280 mmol, 3.50 equiv.) was added dropwise over 13 minutes. The reaction was stirred at ambient temperature for 1 hour. The volatiles were removed to yield an orange solid. The orange solid was slurried in toluene (200 mL) and dried under high vacuum. The solid was slurried in a 50:50 solution of toluene:heptane and filtered through celite. The celite was washed with 2×50 mL of the solution. The filtrate was reduced to a yellow solid. The solid was then slurried and triturated in minimal pentane and filtered through a frit. The yellow solid collected (57.2 g) was analyzed by $^1$H NMR. The spectrum shows signals for the desired metallocene II-Me$_2$ product and the presence of a contaminant, likely BrMgN(TMS)$_2$. The yield of the metallocene II-Me$_2$ obtained was estimated, based on signals in $^1$H NMR spectrum, to be 57%.

INDUSTRIAL APPLICABILITY

Provided is a convenient method for synthesizing a metallocene type polymerization catalyst. Metallocene catalysts are important catalysts for the production of olefin based polymers.

The invention claimed is:

1. A method for making a metallocene (II-Cl$_2$) having the structure,

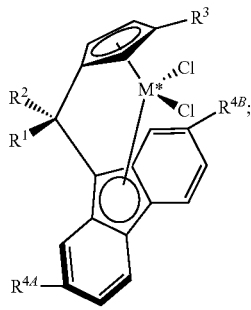

(II-Cl$_2$)

the method comprising forming a compound (I) having the structure,

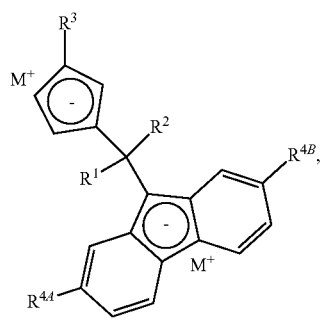

(I)

by combining in a single reaction vessel containing an ether solvent, compounds (i) and (11):

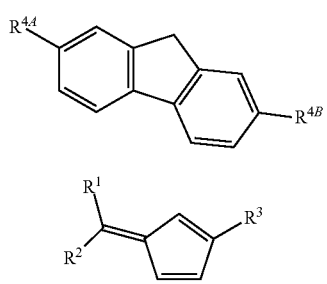

(i)

(ii)

and
with at least 2 molar equivalents of a metal salt of bis(trimethylsilyl)amide of the formula [M$^+$][N(SiMe$_3$)$_2$$^-$] per total number of moles of the compounds (i) and (ii); to give compound (I); and
reacting in the same reaction vessel compound (I) with a Group IV transition metal chloride of the formula M*Cl$_4$;
wherein:
the method is a one pot method;
R$^1$ and R$^2$ are independently an unsubstituted or substituted alkyl, aryl, or alkenyl group;
R$^3$ is hydrogen, or an unsubstituted or substituted alkyl, aryl, or alkenyl group, or a substituted silyl group;

R$^{4A}$ and R$^{4B}$ are independently a hydrocarbyl group, or hydrogen;
M$^+$ is Li$^+$, Na$^+$, or K$^+$; and
M* is Ti, Zr, or Hf.

2. The method of claim 1, wherein R$^1$ and R$^2$ are phenyl groups or substituted phenyl groups.

3. The method of claim 1, wherein R$^1$ and R$^2$ are phenyl groups.

4. The method of claim 1, wherein R$^3$ is hydrogen.

5. The method of claim 1, wherein R$^{4A}$ and R$^{4B}$ are tert-butyl groups.

6. The method of claim 1, wherein M* is Hf.

7. A method for making a metallocene (II-R$^5$$_2$) having the structure,

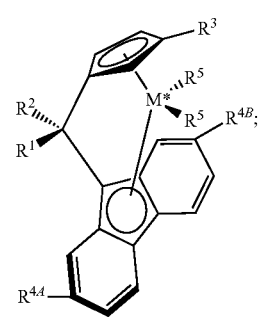

(II-R$^5$$_2$)

the method comprising: forming a compound (I) having the structure,

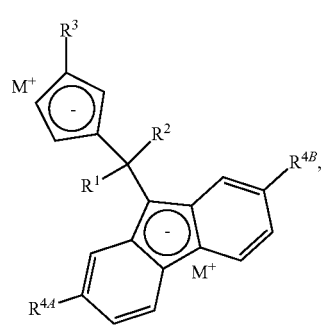

(I)

by combining in a single reaction vessel containing an ether solvent, compounds (i) and (ii):

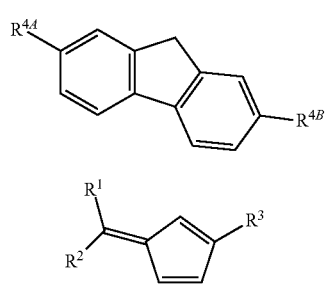

(i)

(ii)

and
- with at least 2 molar equivalents of a metal salt of bis(trimethylsilyl)amide of the formula $[M^+][N(SiMe_3)_2^-]$ per total number of moles of the compounds (i) and (ii); to give compound (I); and
- reacting in the same reaction vessel compound (I) with a Group IV transition metal chloride of the formula $M^*Cl_4$ to produce a metallocene (II-Cl$_2$) having the structure,

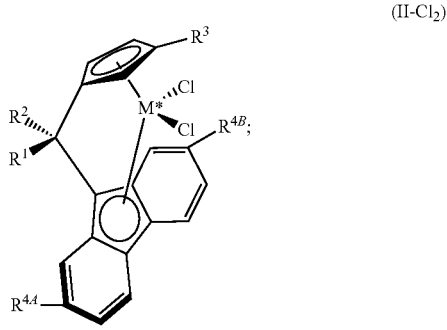

(II-Cl$_2$)

and
- in the same reaction vessel reacting the metallocene (II-Cl$_2$) with at least 2 molar equivalents of an alkylating reagent selected from the group consisting of $R^5Li$ and $R^5MgBr$;

wherein:
- the method is a one pot method;
- $R^1$ and $R^2$ are independently an unsubstituted or substituted alkyl, aryl, or alkenyl group;
- $R^3$ is hydrogen, or an unsubstituted or substituted alkyl, aryl, or alkenyl group, or a substituted silyl group;
- $R^{4A}$ and $R^{4B}$ are independently a hydrocarbyl group, or hydrogen;
- $R^5$ is a methyl, or a benzyl group;
- $M^+$ is Li$^+$, Na$^+$, or K$^+$; and
- $M^*$ is Ti, Zr, or Hf.

8. The method of claim 7, wherein $R^1$ and $R^2$ are phenyl groups or substituted phenyl groups.

9. The method of claim 7, wherein $R^1$ and $R^2$ are phenyl groups.

10. The method of claim 7, wherein $R^3$ is hydrogen.

11. The method of claim 7, wherein $R^{4A}$ and $R^{4B}$ are tert-butyl.

12. The method of claim 7, wherein $M^*$ is Hf.

13. The method of claim 7, wherein $R^5$ is methyl.

* * * * *